United States Patent
Kamekawa

(10) Patent No.: US 6,499,702 B2
(45) Date of Patent: Dec. 31, 2002

(54) CLAMP AND METHOD OF MOUNTING A CONNECTOR ON A WIRE USING SAID CLAMP

(75) Inventor: Satoru Kamekawa, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/793,688

(22) Filed: Feb. 27, 2001

(65) Prior Publication Data

US 2001/0017338 A1 Aug. 30, 2001

(30) Foreign Application Priority Data

Feb. 29, 2000 (JP) .......................................... 2000-053311

(51) Int. Cl.$^7$ ................................................. F16L 3/00
(52) U.S. Cl. ...................... 248/68.1; 248/74.1; 248/74.5
(58) Field of Search ...................... 248/65, 68.1, 67.5, 248/67.7, 74.1, 74.2, 74.3, 74.4, 74.5

(56) References Cited

U.S. PATENT DOCUMENTS

| | | | | |
|---|---|---|---|---|
| 4,457,482 A | * | 7/1984 | Kitagawa | 248/47.3 |
| 4,669,688 A | * | 6/1987 | Itoh et al. | 248/74.2 |
| D291,177 S | * | 8/1987 | Santucci et al. | D8/395 |
| 4,700,913 A | * | 10/1987 | Hirano et al. | 248/73 |
| 4,805,479 A | * | 2/1989 | Brightwell | 74/502.4 |
| 4,944,475 A | * | 7/1990 | Ono et al. | 248/71 |
| 5,390,882 A | | 2/1995 | Lee et al. | 248/68.1 |
| 5,535,969 A | * | 7/1996 | Duffy, Jr. | 248/68.1 |
| 5,760,338 A | | 6/1998 | Suzuki | 174/72 A |
| 5,814,770 A | * | 9/1998 | Pieck et al. | 174/135 |
| 6,131,991 A | | 10/2000 | Sugitani | 296/208 |

FOREIGN PATENT DOCUMENTS

| | | |
|---|---|---|
| JP | 62115722 | 7/1987 |
| JP | 11-18255 | 1/1999 |
| JP | 11215666 | 8/1999 |

OTHER PUBLICATIONS

English Language Abstract of JP 11–215666.
English Language Abstract of JP 11–18255.

* cited by examiner

Primary Examiner—Anita King
Assistant Examiner—Steven Marsh
(74) Attorney, Agent, or Firm—Greenblum & Bernstein P.L.C.

(57) ABSTRACT

In order to achieve the object that a connector connected with a branch line from the trunk line of a wire harness is fixed to the trunk line utilizing a clamp, a clamp having a rectangular shaped base member is provided. The base member is arranged along one side of the outer periphery of a group of electric wires of the wire harness trunk line, and the opposite ends, in a longitudinal direction of the base member, are fixed to the wire harness by tape wrapping. The clamp also includes an automobile body hooking part protruding from an outer face of the base member, and an electric wire guide protrudes from an inner face of the base member. The wire guide is provided with concave portions for insertion of electric wires, and a connector locking part is provided on the upper face of the electric wire guide. Electric wires are inserted into the concave portions of the electric wire guide and are fixed to the opposite ends of the base member situated on one side of the outer periphery of the electric wire groups. Additionally, the locking part of the connector to be connected with a wire harness branched line terminal is locked to the opposite side of the outer periphery of the electric wire group.

14 Claims, 6 Drawing Sheets

CLAMP AND METHOD OF MOUNTING A CONNECTOR ON A WIRE USING SAID CLAMP

BACKGROUND OF THE INVENTION

1. Field of the Invention

The present invention relates to a clamp and a structure for mounting a connector onto a wire harness using the clamp. More particularly, a connector connected with a branch line of a wire harness trunk line is fixed to the wire harness utilizing a clamp that hooks the wire harness to an automobile body.

2. Description of Background Information

In a wire harness wired in an automobile, as shown in FIG. 6, a clamp 1 for mounting on a car body has been conventionally installed on a wire harness W/H, and a connector 2 is connected with the end of a branch wire W/H-2 which is branched from the trunk line W/H-1 of the wire harness W/H. When the connector 2 is required to be retained in the wire harness W/H, the connector 2 is wrapped and fixed to the wire harness W/H using a pressure sensitive tape 3.

As shown in FIG .7, the installation order of the clamp 1 with the connector 2 for the above-mentioned wire harness W/H is that the connector 2 is fixed by wrapping the pressure sensitive tape 3 only after the clamp 1 is installed on the wire harness W/H. At that time, since it is necessary to carefully align the installation direction of the clamp 1, the operability is made more difficult. Further, even if the connector 2 is installed at a fixed position, deviation in the position of the clamp 1 may occur during transportation because of the tape wrapping.

Further, since the tape 3 is wrapped on the connector 2, the locking part 2a that is provided on the outer face of the connector 2 is covered by the tape 3.

Accordingly, when the opposite side connector 5 of the terminal of another wire harness W/H' is fitted with the connector 2 in the assembly line of automobile, as shown in FIG. 8, a worker carries out the fitting work while pressing the tape 3 with fingers. Therefore, the lock 2a is pressed and there is a problem that an incomplete fitting is likely to occur.

Further, installation of the clamp 1 and installation of the connector 2 on the wire harness W/H are both required, and thus there is a problem that the installation may be difficult.

The present invention was developed with the above problems in mind, and one object of the present invention is to prevent the occurrence of the incomplete fitting of the connector by eliminating the fixation of the connector by tape. In another aspect of the present invention, the direction of the connector 2 relative to the clamp is designed to be automatically regulated, and the installation of the clamp and the connector on the wire harness W/H is designed to be easily carried out to improve working efficiency.

SUMMARY OF THE INVENTION

In order to solve the above-mentioned problems, the present invention provides a clamp having a generally rectangular shaped base member which is arranged along one side of the outer periphery of a group of electric wires of a wire harness trunk line and opposite ends of which, in a longitudinal direction, are fixed to the wire harness by tape wrapping. An automobile body hooking part protrudes from an outer face of the base member, and an electric wire guide protrudes from an inside face of the base member. The wire guide is provided with concave portions for insertion of electric wires that are received in semi-arc shaped portions of the concave portions, and the wire guide also has a wide upper face. A connector locking part is provided on the upper face of the electric wire guide.

Further, the present invention provides a structure for fixing a connector on the wire harness utilizing the clamp described above, by locking a locking part of the connector connected with a wire harness branched line terminal on the above-mentioned connector locking part. In this regard, the electric wires are inserted into the concave portions of the electric wire guide and the wires are fixed by tape wrapping on the opposite ends of the base member positioned at one side of the outer periphery of the electric wire groups, with the locking part protruding on the other side of the outer periphery of the electric wire group.

The mounting structure of the above-mentioned connector can preferably be used in case of being interfittedly connected with an opposite side connector connected with another wire harness terminal. Further, the structure is not only limited to a connector in the case of connecting wire harnesses to each other by the connector, but can also be applied in the case of a joint connector.

The locking part of the above-mentioned clamp and the locking part of the connector are preferably a cassette type lock in which a hook of the locking part is locked on a central connection part of a generally H-shaped lock part.

As described above, when the locking part of the connector is provided unitarily with the clamp by which the wire harness is fixed to the automobile body, it becomes unnecessary to consider the installation direction of the connector, and the mounting of the connector can be carried out by a one touch operation of only locking the locking part of the connector on the locking part of the clamp, therefore the working efficiency can be improved. Further, since the connector is not wound by tape wrapping, the locking part of the connector is not covered. Thus, the occurrence of an incomplete fitting of the mating connectors, which has occurred in the case of fixing the connector by tape wrapping, can be prevented.

According to another aspect of the present invention, a clamp for mounting a connector to a wire harness is provided. The clamp includes a base member having first and second ends, the base member being positionable on an outer periphery of the wire harness and the first and second ends being securable to the wire harness by tape wrapping. A wire guide extends upwardly from an upper face of the base member, the wire guide having at least one concave portion for receiving wires of the wire harness and having a connector mounting portion. Additionally, a connector locking part is provided on the connector mounting portion.

In another aspect of the present invention, the at least one concave portion includes two concave portions, and each concave portion is provided on an opposite side of the wire guide so that the wires of the wire harness may be divided into two groups, with each group of wires being inserted into a respective concave portion.

In other aspects of the present invention, the clamp may further include a hooking part provided on a lower face of the base member, the hooking part being mountable in an aperture of an automobile body to secure the clamp thereto, the base member may have a generally rectangular configuration, the connector locking part may include a generally H-shaped member fixed at one end of the H-shape to the connector mounting portion, and the connector mounting portion of the wire guide may include a generally planar portion.

According to a further aspect of the present invention, a method of fixing a connector to a wire harness is provided. The method includes providing a clamp including a base member having first and second ends, the base member being positionable on an outer periphery of the wire harness and the first and second ends being securable to the wire harness by tape wrapping, a wire guide extending upwardly from an upper face of the base member, the wire guide having at least one concave portion for receiving wires of the wire harness and having a connector mounting portion, and a connector locking part provided on the connector mounting portion. The method further includes inserting the electric wires of the wire harness into the at least one concave portion, wrapping adhesive tape around the wire harness and the first and second ends of the base member, and locking a connector of a wire harness branched line terminal to the connector locking part.

In a further aspect of the present invention, the at least one concave portion may include two concave portions, and the method may further include dividing the wires of the wire harness into two groups, and inserting each group of wires into a respective concave portion prior to the wrapping.

DETAILED DESCRIPTION OF THE PREFERRED EMBODIMENTS

The mode of operation of the present invention is illustrated below with reference drawings.

Figure 1:
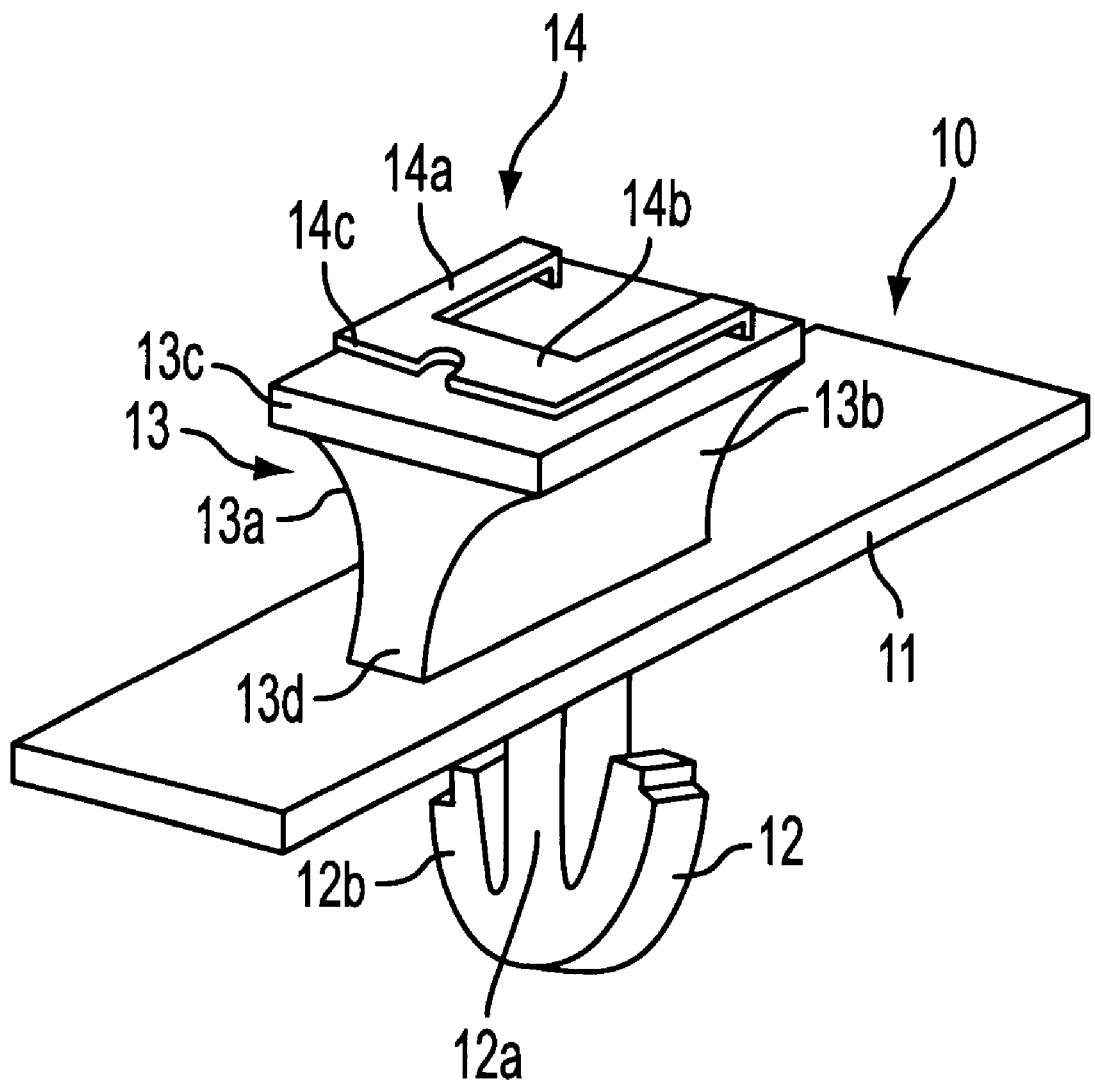
FIG. 1 is a perspective view of the clamp of the present invention.

FIG. 1 depicts a clamp 10 according to one aspect of the invention. The clamp 10 is provided with a generally rectangular shaped base member 11 which is to be arranged along one outer peripheral side of an electric wire group of a wire harness trunk line. An automobile body hooking part 12 protrudes from the outer face of base 11, and an electric wire guide 13 protrudes from the base member 11. The wire guide 13 includes concave portions parts 13a, 13b for receiving electric wires that are recessed in semi-arc shaped portions of the concave portions. The wire guide 13 also includes a wide upper face 13c, and a connector locking part 14 is provided on the upper face 13c of the electric wire guide 13.

Figure 2:
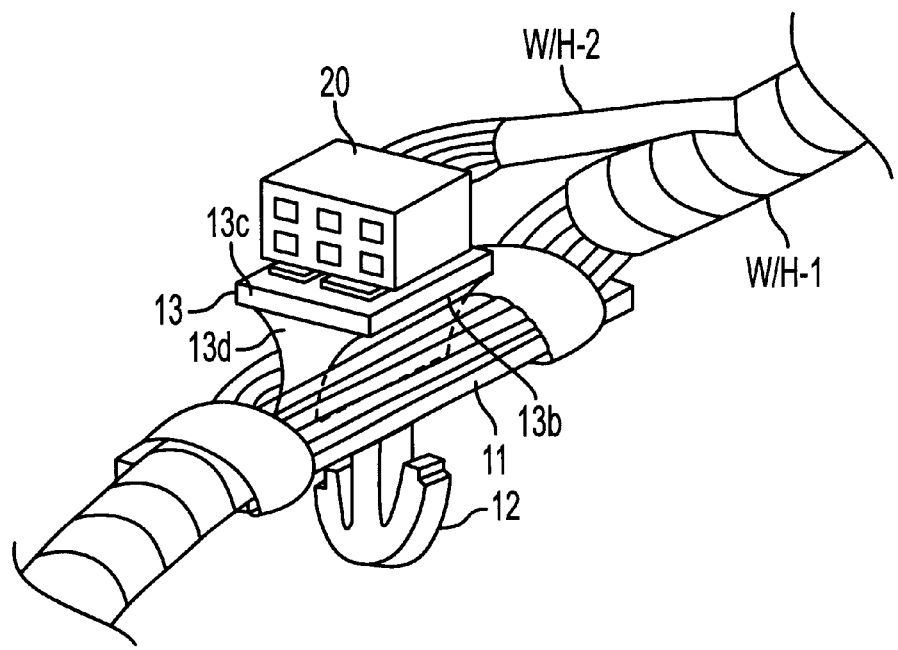
FIG. 2 is a perspective view of a condition in which the clamp of FIG. 1 is installed on a wire harness and the connector is installed on the clamp.

The electric wire guide 13 protrudes from the central part in the longitudinal direction of the base member 11. The concave portions 13a, 13b on both sides of the electric wire guide 13 are sandwiched along the insertion direction of electric wires, as shown in FIG. 2. Additionally, the support part 13d between the concave portions 13a and 13b is configured to be positioned centrally of the electric wire group by dividing the electric wire group approximately in two and inserting the wires into the semi-arc shaped concave portions 13a, 13b.

The above-mentioned automobile body hooking part 12 is a wing type automobile body hooking part in which the hooking wing 12b protrudes from an edge of the axial part 12a in a folded shape. Further, the connector locking part 14 provided on the upper face 13c of the electric wire guide 13 is formed as a generally H-shaped cassette type locking part, and one end of a pair of lateral frame parts 14a is fixed on the upper face 13c. A connection part 14b is movably mounted on the other end, and the edge of the connection part 14b is formed as the hooking face 14c.

Figure 3:
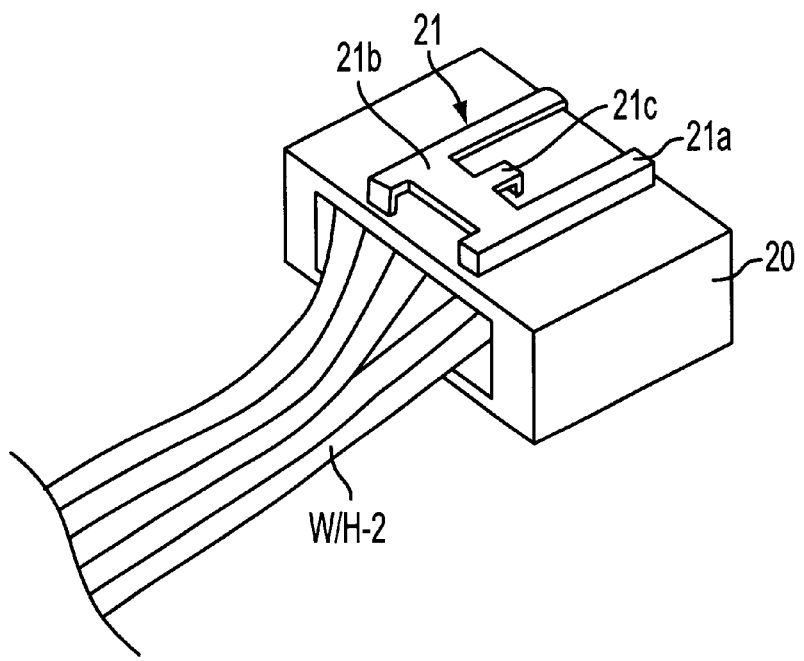
FIG. 3 is a perspective view of the connector of the present invention connected with branch line.

As shown in FIG. 2, the connector shown in FIG. 3 is connected with the terminal of the branch line W/H-2 which is branched from the trunk line W/H-1 of the wire harness, and the cassette type locking part 21, which is connected by lock with the above-mentioned connector locking part 14, is provided on the housing outer face of the connector 20. The cassette type locking part 21 includes a pair of guides 21a, having an L-shaped cross-section, which is fitted with the lateral frame parts 14a of the locking part 14. The connection part 21b connecting the guide part 21a and the lock hook 21c protrude from the connection part 21b and are hooked on the connection part 14b.

Figure 8:
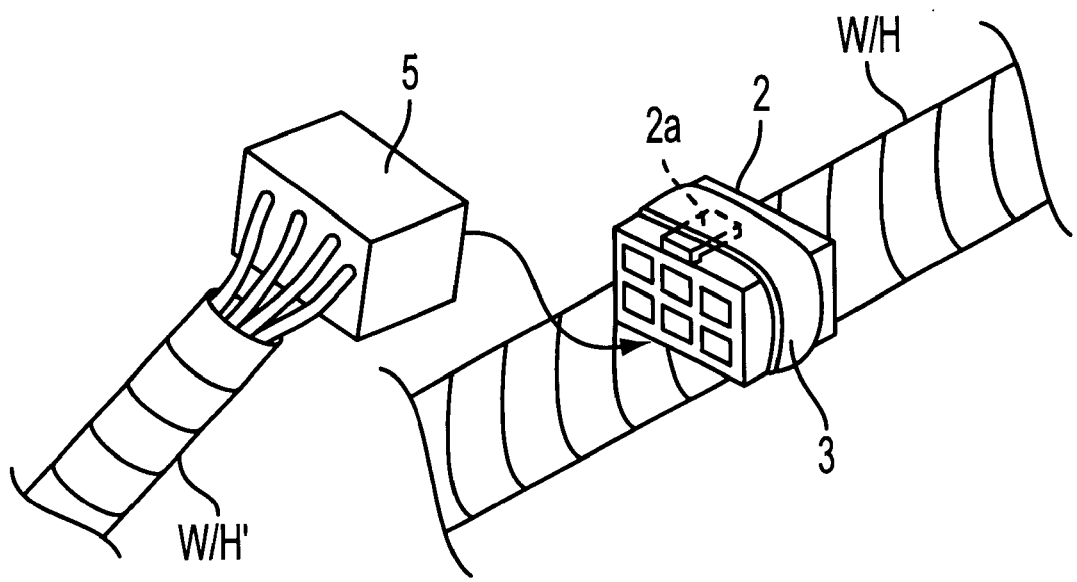
FIG. 8 depicts a problem of a conventional assembly.

The connector 20 is connected with the opposite side connector 5 (as in FIG. 8) which is connected with the end of another wire harness, but it may be a joint connector or any optional connector.

A description of the assembly method is as follows.

Figure 4A:
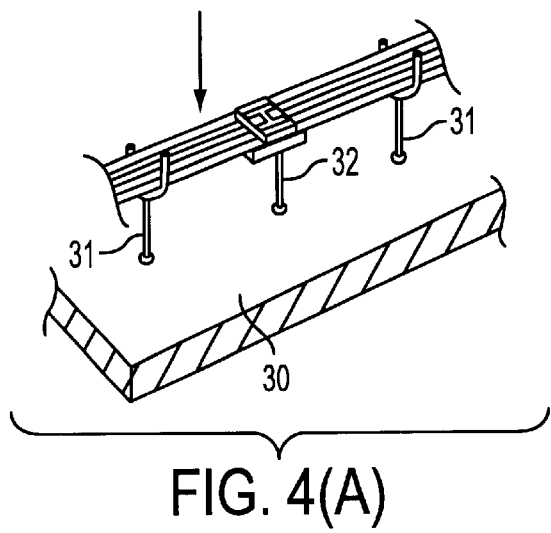
FIG. 4(A) to FIG. 4(E) are schematic views showing the assembly steps.

As shown in FIG. 4(A), the electric wires w are wired on a protruding wiring jig 31 while being retained on the assembly work stand 30 of a wire harness. A support jig 32 for a clamp protrudes at a fixed position, and the clamp 10 is arranged along a wiring course. At this time, the clamp 10 is positioned with the automobile body hooking part 12 extending downwardly, and the base 11 is positioned below the electric wire group which is wired, and the electric wire guide 13 protrudes from the electric wire insertion part.

Figure 4B:
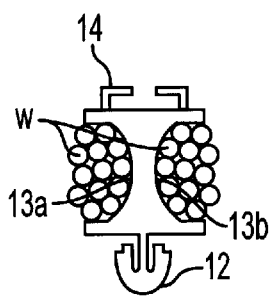
Figure 4C:
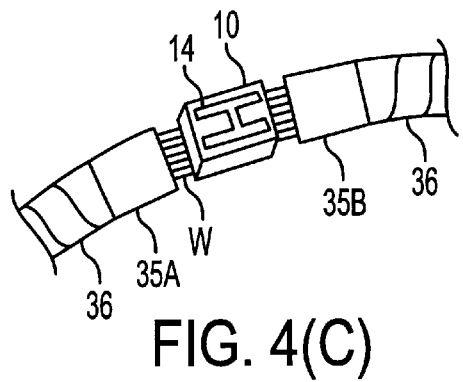

Then, as shown in FIG. 4(B), the electric wires w are inserted in the concave portions 13a, 13b of the electric wire guide 13, such that the insertion amount into the concave portions 13a, 13b is apportioned about equally. After all of the electric wires w are inserted, as shown in FIG. 4(C), both ends of the base member 11 and the electric wire group W are wrapped with the tapes 35A, 35B. Further, the electric wire group W fixed on the base member 11 by the tapes 35A, 35B is removed from the support jig 32, and the other electric wire groups W are wrapped with the tape 36 to be bundled.

Figure 4D:
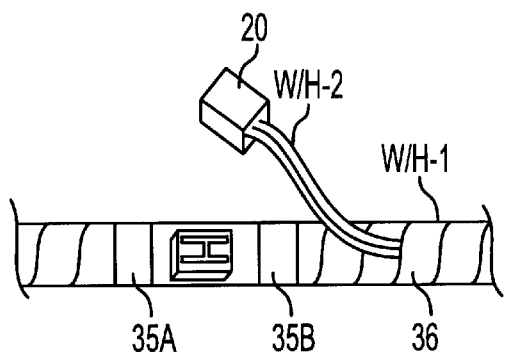
Figure 4E:
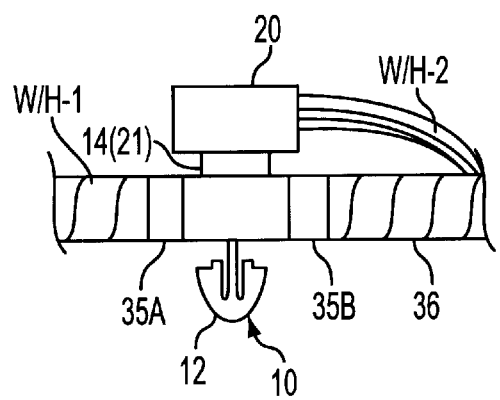

Then, as shown in FIG. 4(D), the connector 20 connected with the terminal of the branch line W/H-2 which is branched from the trunk line W/H-1 is pulled out to the clamp 10 side, and as shown in FIG.4(E), the connector locking part 14 of the clamp 10 and the locking part 21 of the connector 20 are locked together.

Further, when the electric wires w are narrow, the electric wire groups are fixed on the base 11 of the clamp 10 by tape wrapping after wiring all of the electric wire groups, the electric wire guide 13 is inserted between the electric wire groups, and may be divided to permit insertion of the electric wires in the concave portions 13a, 13b. Further, when the number of the electric wires w is small, the electric wires w may be inserted on only one side concave part 13a.

Figure 5:
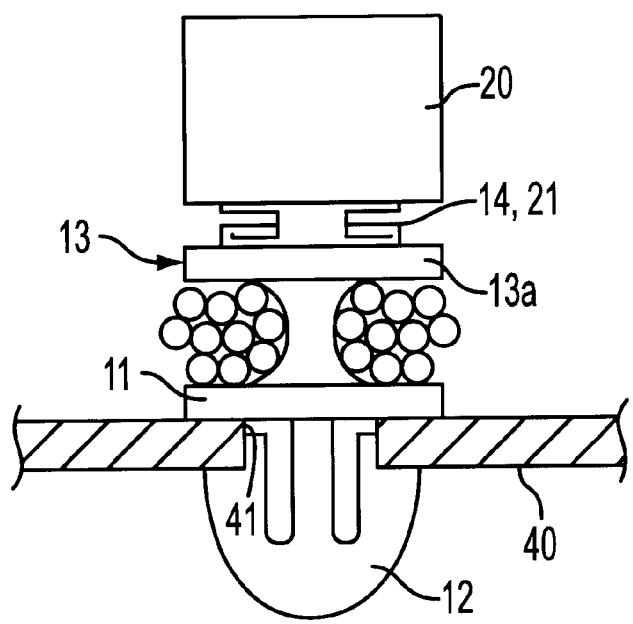
FIG. 5 is a schematic view showing a condition in which the clamp and connector are fixed an automobile body.
Figure 6:
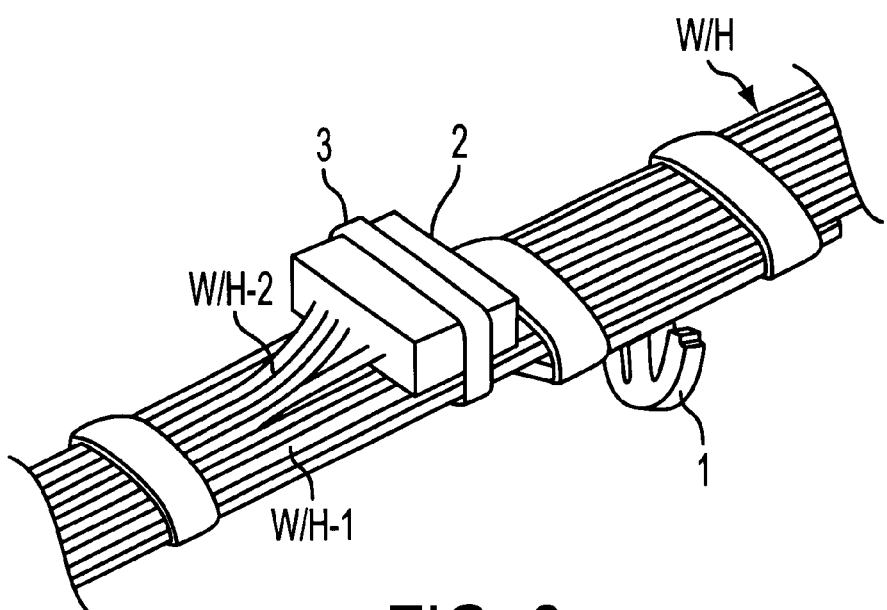
FIG. 6 a perspective view showing an example of a conventional assembly.
Figure 7:
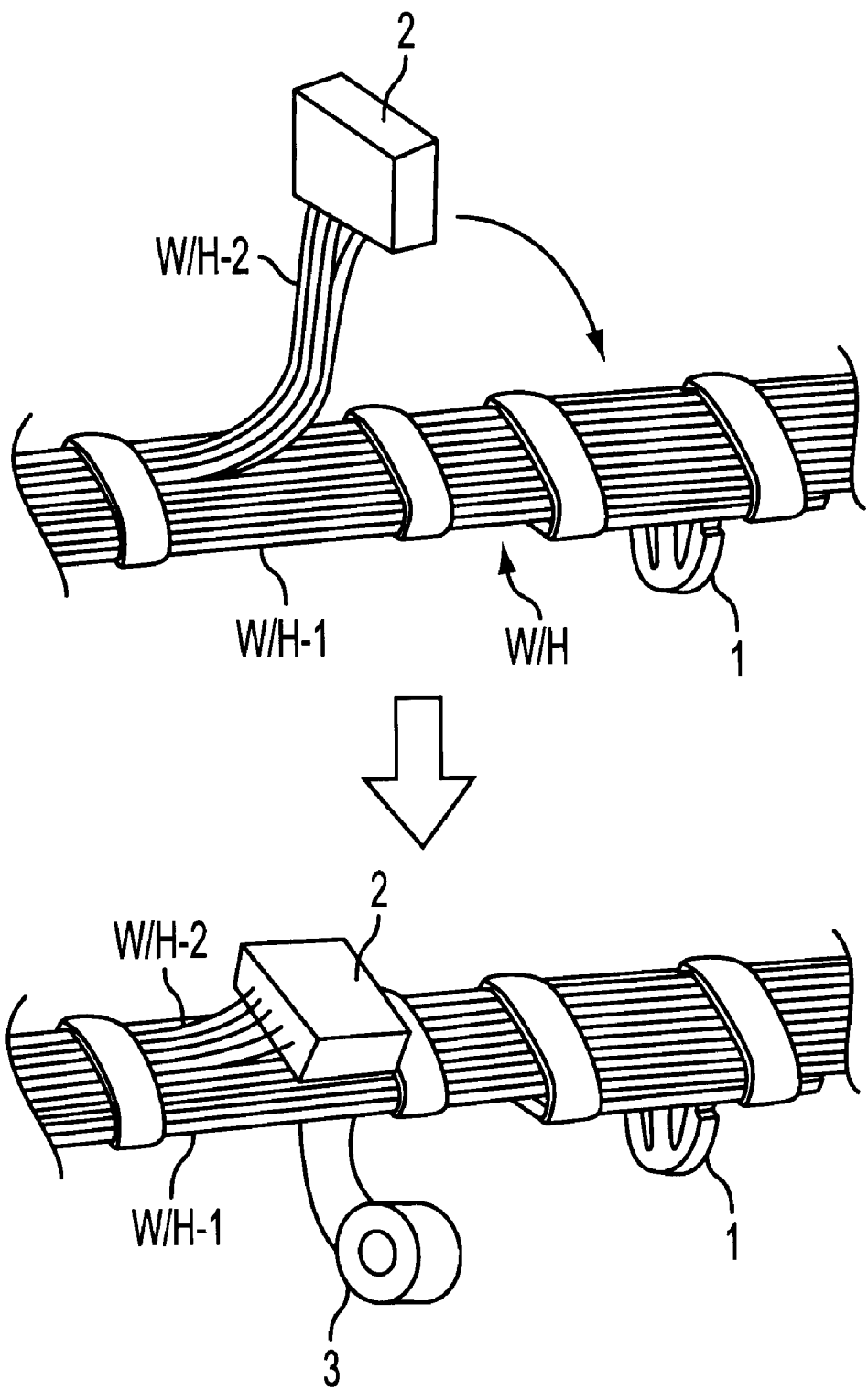
FIG. 7 is a schematic view showing a conventional assembly method.

As described above, the clamp 10 mounted to the wire harness is fixed by inserting and hooking the automobile body hooking part 12 in the clamp hole 41 of the automobile body 40, in the assembly line of the automobile, as shown in FIG. 5. Further, the opposite side connector of another wire harness is fitted and connected with the connector 20 fixed on the clamp 10. At this time, since tape is not wrapped on the connector 20, the locking part (not illustrated) provided on the outer face of the housing of the connector is exposed to the outside, and thus the opposite side connector and the connector 20 can be fitted and connected without covering the locking part by tape wrapping, and the incomplete fitting of the mutual connectors caused by pressing of the locking part can be prevented.

As is clear from the description above, according to the present invention, since the locking part locking the connector of the branch line terminal is provided on the clamp for hooking the automobile body that is installed on the trunk line of the wire harness, it is not necessary to carefully align the direction of the connector. Further, the work of mounting the connector on the trunk line by tape wrapping is also not necessary, and the connector can be easily installed on the outer periphery of the wire harness trunk line.

Further, since the semi-arc shaped recesses for insertion of the electric wires are provided on both sides of the clamp and the electric wires are inserted into these recesses by dividing them, the electric wire guide is situated centrally of the electric wires. Since the connector is fixed on the upper face of the electric wire guide, the connector can be supported on the central upper side of the electric wire group in a stable condition. Further, the mounting force of the clamp against the electric wire group can be enhanced.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. JP 2000-053311, filed on Feb. 29, 2000, which is expressly incorporated herein by reference in its entirety.

What is claimed is:

1. A clamp for mounting a connector to wire a harness, said clamp comprising:
a base member extending in a longitudinal direction and having first and second ends in the longitudinal direction, said base member being positionable on an outer periphery of the wire harness and said first and second ends being securable to the wire harness by tape wrapping;
a wire guide extending upwardly from an upper face of said base member and extending in the longitudinal direction, said wire guide being located intermediate sides of said base member and on said base member with respect to a width of said base member, said wire guide having two concave portions, each concave portion being arraged on an opposite side of said wire guide so that wires of the wire harness may be divided into two groups, such that each group of wires is insertable into a respective concave portion, said wire guide further comprising a connector mounting portion having a width and a length in the longitudinal direction that is greater than the width; and
a connector locking part provided on said connector mounting portion.

2. The clamp according to claim 1, further comprising a hooking part provided on a lower face of said base member, said hooking part being mountable in an aperture of an automobile body to secure said clamp thereto.

3. The clamp according to claim 1, wherein said base member has a generally rectangular configuration.

4. The clamp according to claim 1, wherein said connector locking part comprises a generally H-shaped member fixed at one end of the H-shape to said connector mounting portion.

5. The clamp according to claim 1, wherein said connector mounting portion of said wire guide comprises a generally planar portion.

6. The clamp according to claim 5, wherein said connector locking part comprises a generally H-shaped member fixed at one end of the H-shape to said connector mounting portion.

7. A method of fixing a connector to a wire harness, said method comprising:
providing a clamp including a base member extending in a longitudinal direction and having first and second ends in the longitudinal direction, said base member being positionable on an outer periphery of the wire harness and said first and second ends being securable to the wire harness by tape wrapping, a wire guide extending upwardly from an upper face of said base member and extending in the longitudinal direction, said wire guide being centrally located on said base member with respect to a width of said base member, said wire guide having two concave portions for receiving wires of the wire harness, said wire guide further comprising a connector mounting portion having a width and having a length in the longitudinal direction that is greater than the width, and a connector locking part;
inserting the wires of the wire harness into a respective one of said two concave portions after the wires are divided into two groups of wires;
wrapping adhesive tape around the wire harness at said first and second ends of said base member after each group of wires is inserted into a respective concave portion; and
locking a connector of a wire harness branched line terminal to said connector locking part.

8. The clamp of claim 1, further comprising a hooking part for attaching the clamp to a surface.

9. The clamp of claim 1, wherein a portion of said wire guide that is located intermediate the sides of said base member has a width and a length in the longitudinal direction that is greater than the width.

10. The clamp of claim 1, wherein said wire guide is centrally located on said base member.

11. The clamp of claim 1, further comprising a body hooking part positioned on said base member.

12. The method of claim 1, further comprising:
attaching the clamp to a surface.

13. A clamp for mounting a connector to a wire harness, the clamp comprising:
- a base member having a first end and a second end;
- each of said first and second ends being securable to the wire harness by tape;
- a connector locking part;
- a wire guide comprising one end attached to said base member and another end attached to said connector locking part;
- said wire guide further comprising a first concave portion and a second concave portion;
- said first concave portion being configured to receive a group of wires of the wire harness and said second concave portion being configured to receive another group of wires of the wire harness.

14. A method of fixing a connector to a wire harness using a clamp which comprises a base member having a first end and a second end, each of the first and second ends being securable to the wire harness by tape, a connector locking part, a wire guide comprising one end which is attached to the base member and another end which is attached to the connector locking part, the wire guide further comprising a first concave portion and a second concave portion, the first concave portions being configured to receive a group of wires the wire harness and the second concave portion being configured to receive another group of wires of the wire harness, said method comprising:
- placing wires of the wire harness in each of the first and second concave portions;
- securing each of the first and second ends of the base member to the wire harness with tape; and
- connecting the connector to the wire guide via the connector locking part.

* * * * *

UNITED STATES PATENT AND TRADEMARK OFFICE
CERTIFICATE OF CORRECTION

PATENT NO.    : 6,499,702 B2
DATED         : December 31, 2002
INVENTOR(S)   : S. Kamekawa It is certified that error appears in the above-identified patent and that said Letters Patent is hereby corrected as shown below:

Column 5,
Line 54, "wire a" should be -- a wire --.

Column 6,
Line 65, "claim 1" should be -- claim 7 --.

Column 8,
Line 7, "portions" should be -- portion --.
Line 8, after "wire" (first occurrence) insert -- of --.

Signed and Sealed this

Twenty-first Day of October, 2003

JAMES E. ROGAN
*Director of the United States Patent and Trademark Office*